(12) United States Patent
Alvarado

(10) Patent No.: US 9,487,190 B1
(45) Date of Patent: Nov. 8, 2016

(54) EMERGENCY BRAKE SYSTEM FOR VEHICLES AND AIRCRAFT

(71) Applicant: Alfredo Alvarado, Bogota D.C. (CO)

(72) Inventor: Alfredo Alvarado, Bogota D.C. (CO)

( * ) Notice: Subject to any disclaimer, the term of this patent is extended or adjusted under 35 U.S.C. 154(b) by 0 days.

(21) Appl. No.: 14/618,439

(22) Filed: Feb. 10, 2015

(51) Int. Cl.
*B60T 1/14* (2006.01)

(52) U.S. Cl.
CPC ....................................... *B60T 1/14* (2013.01)

(58) Field of Classification Search
CPC ............ B60T 1/00; B60T 1/14; B60T 8/248; B62B 5/04; B62D 55/20
USPC ...................................................... 188/2 R, 5
See application file for complete search history.

(56) References Cited

U.S. PATENT DOCUMENTS

| | | | | |
|---|---|---|---|---|
| 2,692,658 A | * | 10/1954 | Bigio | B60T 1/14 188/5 |
| 2,710,074 A | * | 6/1955 | Simpson | B60T 1/14 188/5 |
| 2,847,092 A | * | 8/1958 | Noyes | B62B 5/049 188/5 |
| 2,871,986 A | * | 2/1959 | Polovitch | B60T 1/14 188/5 |
| 3,062,327 A | * | 11/1962 | Debus | B60T 1/14 134/168 C |
| 3,799,293 A | | 3/1974 | Howells et al. | |
| 3,994,369 A | * | 11/1976 | Powaska | B60T 1/14 188/5 |
| 4,265,338 A | | 5/1981 | Shea et al. | |
| 4,317,507 A | * | 3/1982 | McMillan | B60T 1/14 188/2 R |
| 5,439,076 A | | 8/1995 | Percy, Jr. | |
| 5,497,857 A | | 3/1996 | Warren et al. | |
| 6,401,876 B1 | * | 6/2002 | Boros | B60T 8/248 188/2 R |
| 2011/0198161 A1 | * | 8/2011 | Lomazzo | B60T 1/14 188/5 |
| 2013/0037355 A1 | * | 2/2013 | Baker | B60T 1/14 188/5 |

* cited by examiner

*Primary Examiner* — Christopher Schwartz
(74) *Attorney, Agent, or Firm* — Mark D. Bowen; Malin Haley DiMaggio & Bowen, P.A.

(57) ABSTRACT

An extreme emergency brake system designed for vehicles such as trucks, truck-trailers, buses, automobiles, and also for airplanes, during an extreme emergency situation that requires an emergency stopping ability in the event of failure of the normal service brake system, or due to dangerous weather conditions.

3 Claims, 6 Drawing Sheets

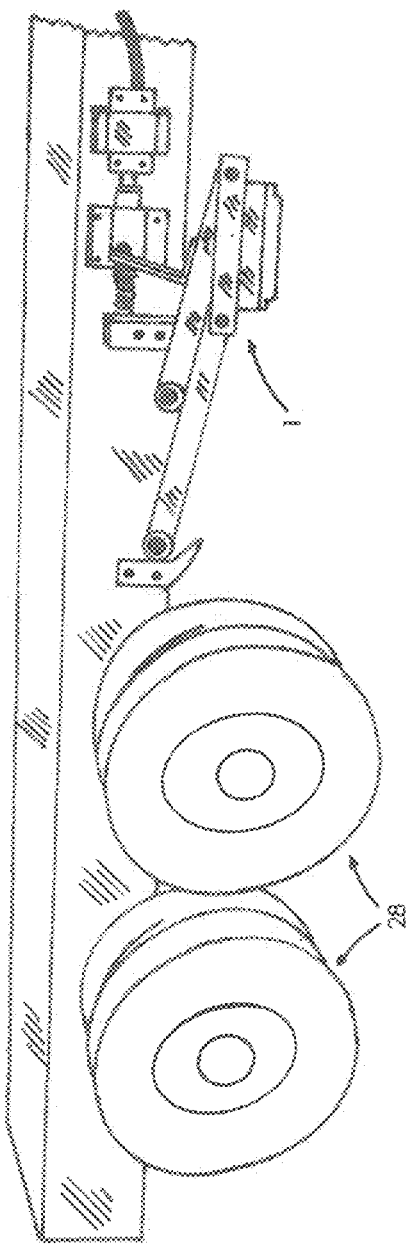

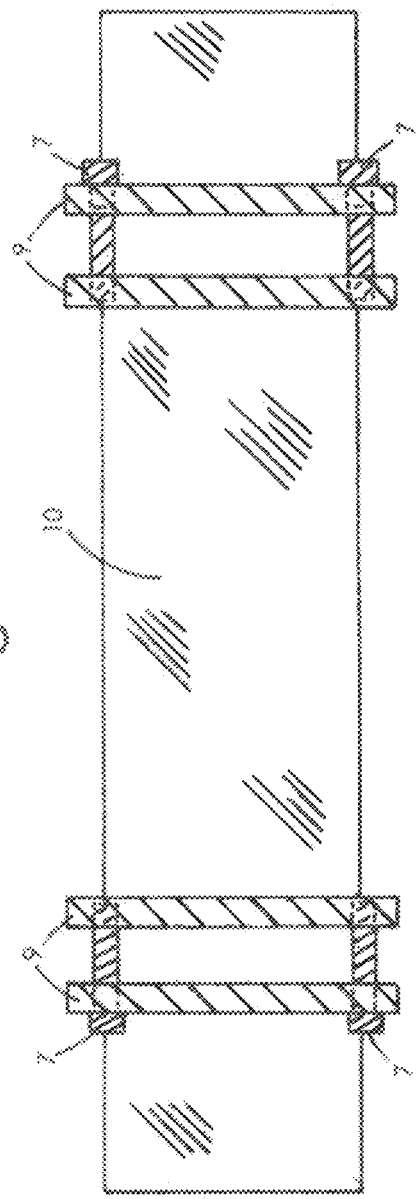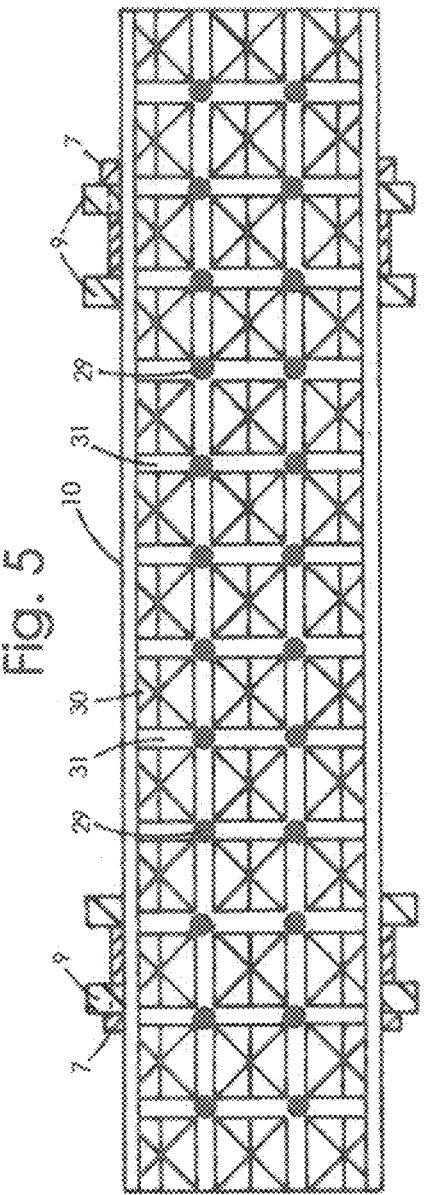

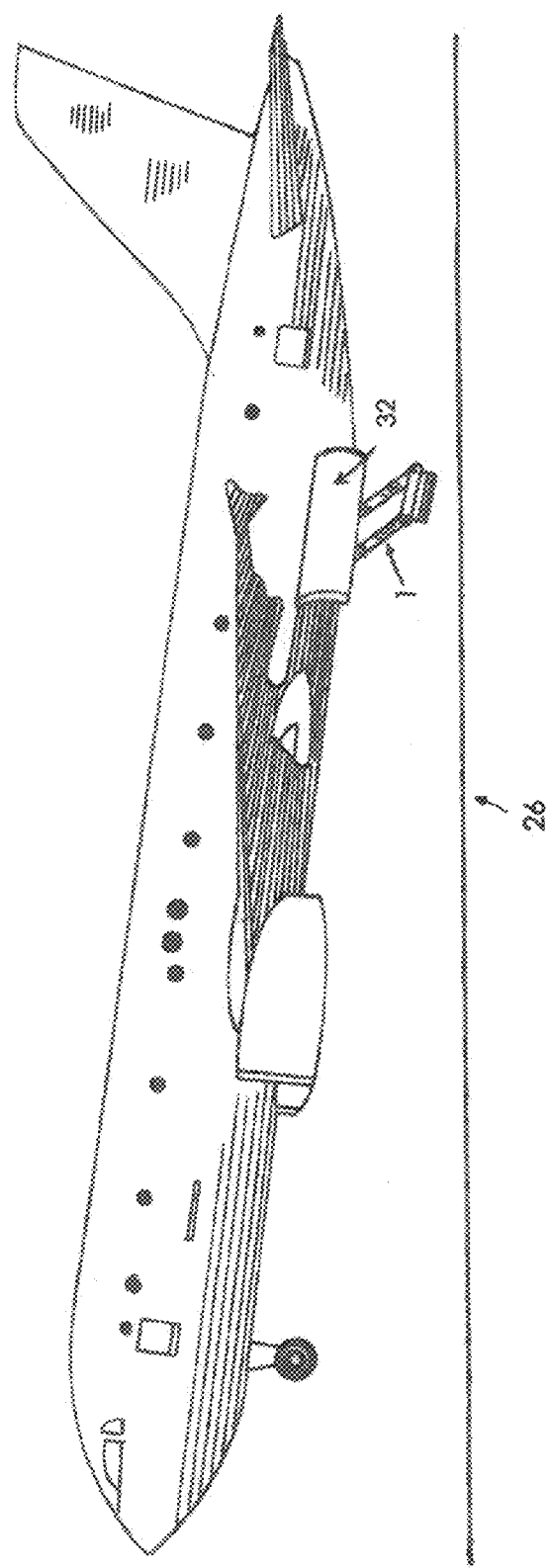

though any suitable material is considered within the scope of the present invention.

EMERGENCY BRAKE SYSTEM FOR VEHICLES AND AIRCRAFT

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever

FIELD OF THE INVENTION

The present invention relates to an auxiliary emergency brake system for vehicles such as trucks, truck-trailers, buses and airplanes. Extreme emergency situations may arise from failure of the regular braking system due to glazed brake pads or failure of the hydraulic or pneumatic systems etc. These emergencies are more frequently encountered in roads in mountainous regions and could be aggravated by severe weather conditions. The same invention can be used to stop an airplane in case of failure of the landing gear, or in case of dangerous conditions of the landing strip due to heavy snow or raining.

SUMMARY OF THE INVENTION

It is an object of the present invention to provide a simple braking system for vehicles and aircraft in extreme emergency situations due to failure of the regular brake system.

It is another object of the present invention to provide a braking system for different types of vehicles during severe weather conditions such as heavy rain or snow.

Yet another object of the present invention to provide a braking system for airplanes in case of failure of the landing gear.

Still another object of the present invention to provide an extreme emergency brake system that reduces the braking distances in case of failure of the regular braking system, or in case of extreme weather conditions.

Another object of the present invention to provide an extreme emergency brake system that stops a trailer-truck without jack-knifing since the brake system is located near the rear wheels of the vehicle.

It is still another object of the present invention to provide an extreme emergency brake system that can be adapted to airplanes by installing the brake system in its cargo bay compartment.

Yet another object of the present invention to provide an extreme emergency brake system that is completely independent of the regular wheel braking system.

Another object of the present invention to provide an extreme emergency brake system that uses an electrical solenoid activation circuit that is independent of the pneumatic or hydraulic system.

It is still another object of the present invention to provide an extreme emergency brake system that can be repositioned manually after being used in an emergency.

Still another object of the present invention to provide an extreme emergency system that can save lives and avoid serious injuries by averting catastrophic road or air accidents.

BRIEF DESCRIPTION OF THE DRAWINGS

FIG. 3 is a side view of the extreme emergency brake system in a raised position and located before the wheels of a tractor-trailer;

FIG. 4 is an upper view of the braking crossbeam described in the present invention;

FIG. 5 is a lower view of the braking crossbeam described in present invention;

FIG. 6 is a side view of an air plane with the deployed extreme emergency brake system approaching the landing strip.

DETAILED DESCRIPTION OF THE INVENTION

Figure 1:
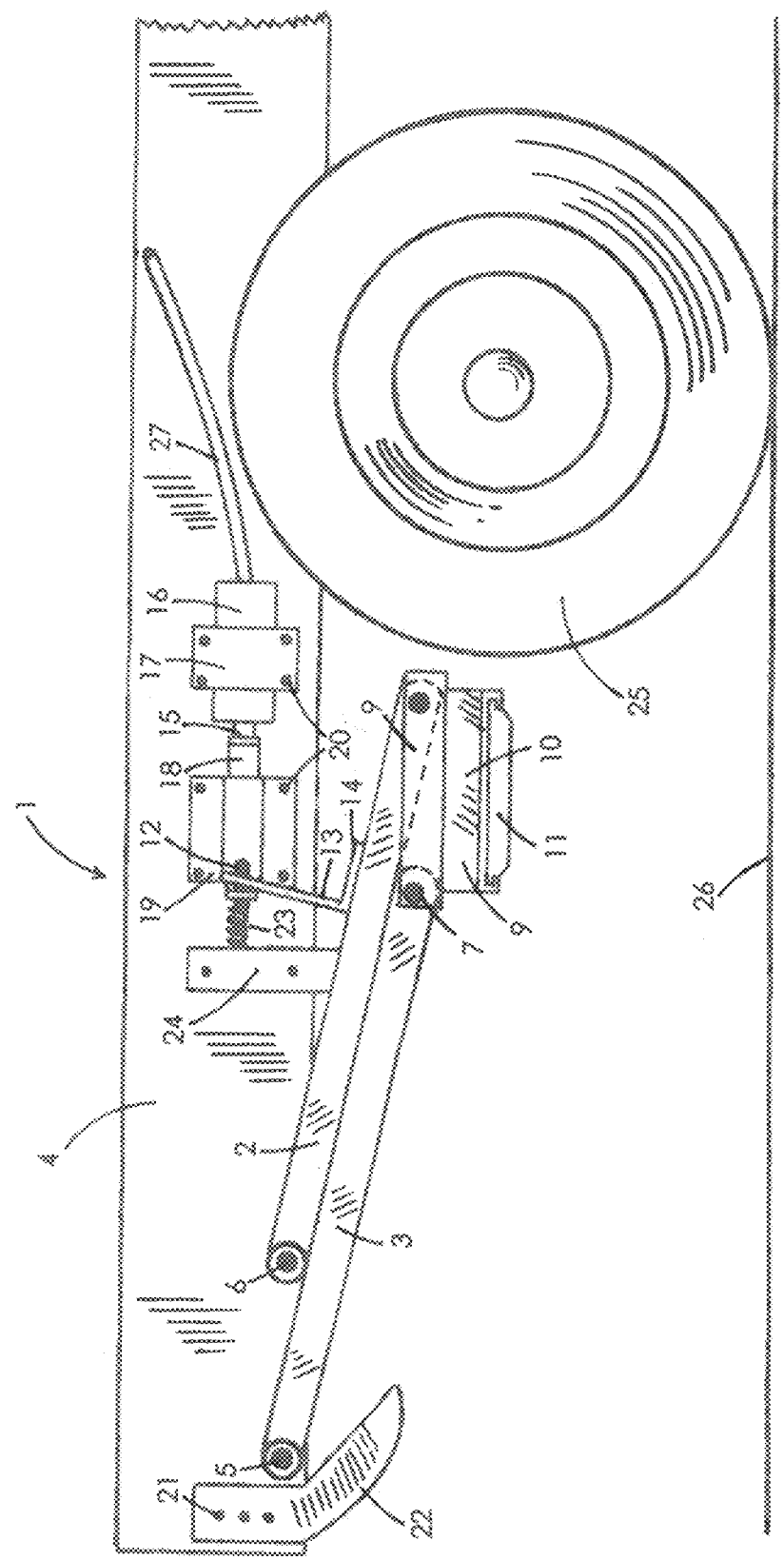
FIG. 1 is a side view of the extreme emergency brake system in a raised or stored position.
Figure 2:
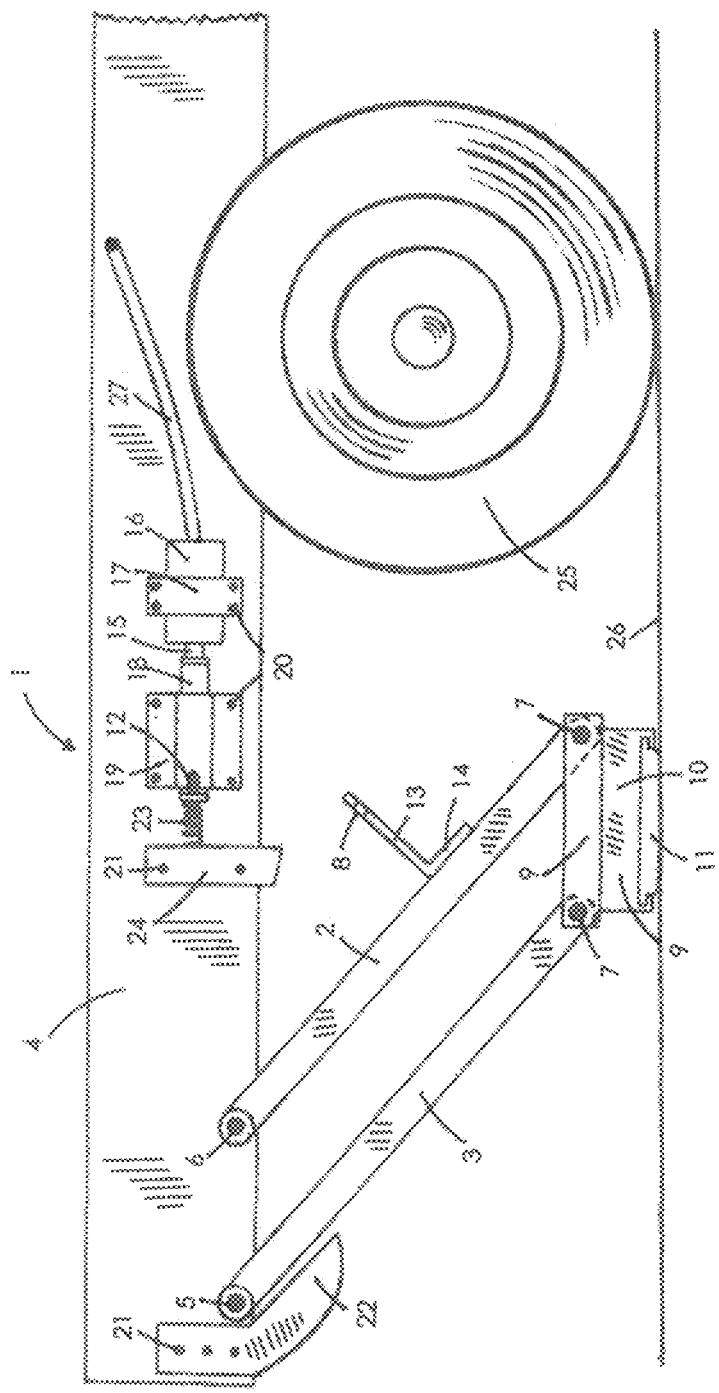
FIG. 2 is a side view of the extreme emergency brake system in a deployed position.

FIGS. 1 and 2 show the extreme emergency brake system, generally referenced as 1, in the stowed and deployed positions respectively, and installed in the rear portion of a truck or bus, just behind the rear wheels. Emergency brake system 1 includes a parallelogram linkage including an upper arm 2 and a lower arm 3 connected at their upper end to the truck or vehicle frame member 4 by mechanical fasteners (e.g. bolts, screws, etc.), referenced as 5 and 6. The lower ends of arms 2 and 3 are connected to supporting bars 9 of a braking crossbeam 10 by mechanical fasteners 7 (e.g. bolts, screws, etc). A braking pad 11 is attached to the lower surface of the crossbeam 10. Braking pad 11 is preferably fabricated from a material having a high coefficient of fiction, such as a rubber or rubber-like material, however any suitable material is considered within the scope of the present invention.

A retaining system maintains emergency brake 1 in a stowed configuration. The retaining system includes a locking pin 12 to prevent deployment of emergency brake system 1, and particularly, pivotal movement of arms 2 and 3, when received within an opening 8 defined in flange extension 13. Locking pin 12 is activated by a push rod 15 of solenoid 16 which is secured to the truck frame member 4 by bracket 17. A sliding plate 18 has a first end in engagement with push rod 15, and a second end attached to locking pin 12. Sliding plate 18 is movably secured relative to truck frame 4 by bracket 19 which is affixed to the frame by mechanical fasteners 20, such as bolts, screws, etc. A stop bar 24 is attached to frame 4 with mechanical fasteners 21, and a coil spring 23 is secured to stop bar 24 and projects therefrom. Spring 23 engages the second end of sliding plate 18 so as to bias the sliding plate against push rod 15 of solenoid 16. Solenoid 16 is activated through an electric control cable 27 and is secured in place by bracket 17 with mechanical fasteners 20. Electric control cable 27 provides a means for allowing a driver or pilot to activate the auxiliary emergency brake system. A restraining stop 22 is attached to rear end of truck frame 4 by fasteners 21, and functions to limit the movement of upper 2 and lower 3 arms when the extreme emergency brake system is deployed. The emergency brake system is deployed when the user (e.g. vehicle driver) actuates electric control cable 27 which in turn activates solenoid 16 whereby push rod 15 engages and moves sliding plate 18 overcoming the spring bias such that locking pin 12 is displaced from opening 8 in flange extension 13. Upon activation, crossbeam 10 drops under the influence of gravity in response to the release of a locking pin 12 which retains a flange extension 13 which is attached to upper arm 2 by securing foot 14.

FIG. 2 shows a braking crossbeam 10 and the braking rubber pad 11 deployed by gravity against road pavement 26. This particular arrangement allows the extreme emergency brake system to obtain its optimal braking potential because the arms are positioned against the road pavement whereby movement of the vehicle maximizes braking pressure, similar to a door bar against the floor.

FIG. 3 shows a perspective view of the extreme emergency brake system 1 in its raised or stowed position and installed in front of the rear wheels 28 of a tractor-trailer. This arrangement will prevent jack-knifing of the trailer.

FIG. 4 is an upper/top view of the braking crossbeam 10 showing two sets of parallel bars, each referenced as 9, attached to braking crossbeam 10 and provided with four bolts 7 that connect the lower ends of the arms 2 and 3 (not shown) to the crossbeam 10. FIG. 5 is a lower/bottom view of the braking crossbeam 10 showing braking rubber pad 11 secured in place by means of multiple bolts 29 to crossbeam 10 and provided with treads 30 and grooves 31, similar to a rubber tire, to improve stopping performance.

FIG. 6 shows an aircraft approaching a landing strip 26 in case of an emergency due to failure of the landing gear. The extreme emergency brake system 1 has been deployed from the cargo bay, after cargo bay compartment doors 32 are open.

Figure 7:
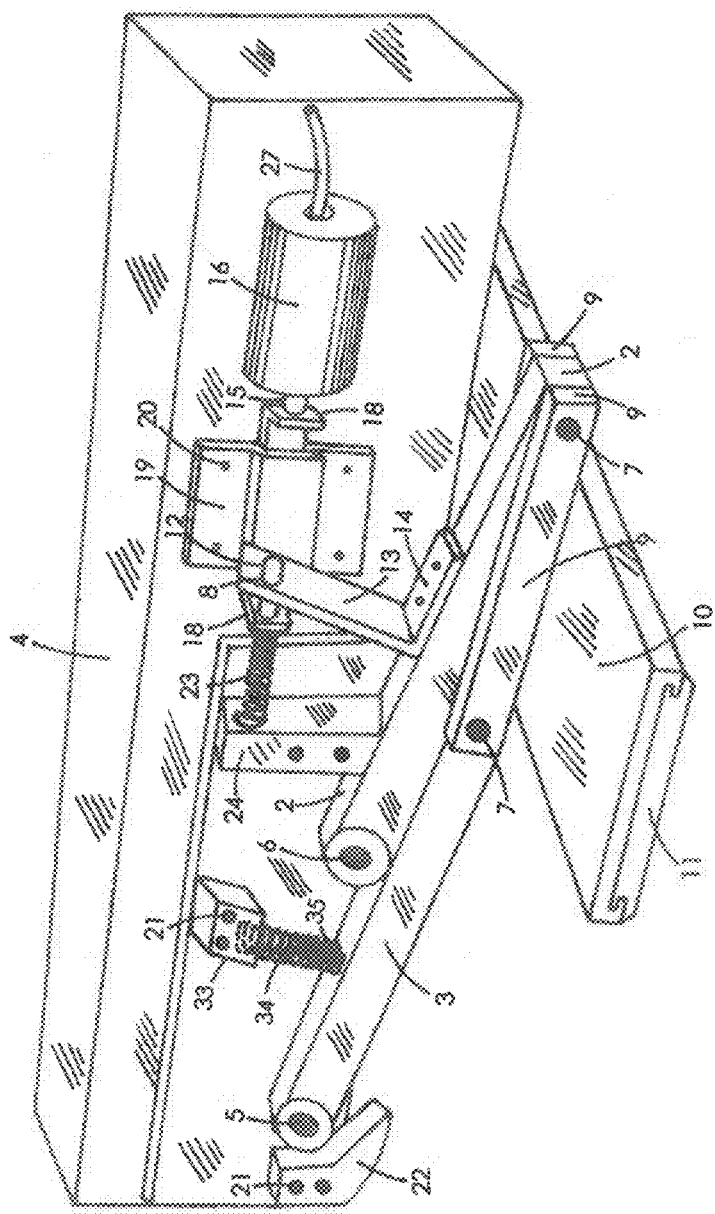
FIG. 7 is a detailed representation of the extreme emergency brake system installed in the rear bay compartment of an airplane.

FIG. 7 is a detailed view of the extreme emergency brake system 1 configured for installation in the rear cargo bay compartment of an airplane (not shown) and in a reversed position (e.g. crossbeam/pad pointing toward the rear/tail end of the airplane). It is provided with a strong spring 34 which is secured in place by supporting block 33 and supporting pin 35. Supporting block 33 is secured in place by mechanical fasteners 21 to frame 4. The extreme emergency brake system is deployed when locking pin 12 is disengaged from opening 8 of retaining extension 13 by of pushing rod 15 of solenoid 16 which pushes sliding plate 18. Sliding plate 18 is secured in place by bracket 19 that is attached to frame 4 with bolts 20. Locking pin 12 is kept inside opening 8 by action of spring 23 during its stowed or raised position. Coil spring 23 is embedded in blocking piece 24 and keeps sliding plate 18 and locking pin 12 engaged in opening 8 of retaining extension 13 that is attached to upper arm 2 by means of securing foot 14. Restraining piece 22 is attached to frame 4 with bolts 21 at front part of frame 4 and it is destined to stop movement of lower arm 3 beyond its limits. In this particular arrangement the braking crossbeam is lighter than the crossbeam of a truck and in this case will provide a smoother braking effect since the speed of a landing plane is much faster than the speed of a truck or bus.

As should be apparent, the auxiliary emergency braking system of the present invention may be adapted for use with land vehicles (e.g. trucks) or an aircraft. Accordingly, the term "vehicle" as used herein shall broadly be construed to mean land vehicles such as trucks, cars, vans, motorcycles, ATV's, and scooters, as well as aircraft.

What I claim is:

1. An auxiliary emergency braking system for a vehicle, said braking system comprising:
   a parallelogram linkage including an upper arm and a lower arm disposed in and maintained in parallel relation, each arm having a first end thereof pivotally connected to the vehicle, and the opposing second end thereof pivotally connected to a braking cross beam having a braking pad affixed to a lower surface thereof;
   said first ends being rearwardly disposed in relation to the direction of vehicle travel relative to said second ends;
   said parallelogram linkage configurable between a raised stowed position and a lowered deployed position wherein said braking pad engages the underlying supporting surface to slow the vehicle;
   a retaining system to retain said parallelogram linkage in said stowed position, said retaining system including a locking pin removably engaging a flange connected to said upper linkage, and a solenoid mechanically configured to disengage said locking pin upon activation;
   said parallelogram linkage deploying from said stowed position under the influence of gravity when said locking pin is disengaged; and
   a restraining stop attached to the vehicle to limit the pivotal movement of said parallelogram linkage when said brake system is deployed.

2. The auxiliary emergency braking system according to claim 1, wherein said upper and lower arms are pivotally connected to the vehicle at a location disposed reward relative to said opposing ends thereof when in the stowed configuration.

3. The auxiliary emergency braking system according to claim 1, wherein upon activation, said braking crossbeam drops under the influence of gravity when said locking pin is disengaged.

* * * * *